June 25, 1968  P. M. TERMET  3,389,425
DEVICE FOR SLAUGHTERING SMALL ANIMALS FOR FOOD
Filed Aug. 19, 1966  3 Sheets-Sheet 1

INVENTOR.
PIERRE MICHEL TERMET

June 25, 1968   P. M. TERMET   3,389,425
DEVICE FOR SLAUGHTERING SMALL ANIMALS FOR FOOD
Filed Aug. 19, 1966   3 Sheets-Sheet 2
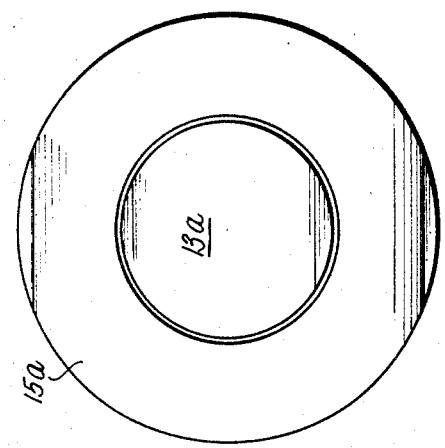
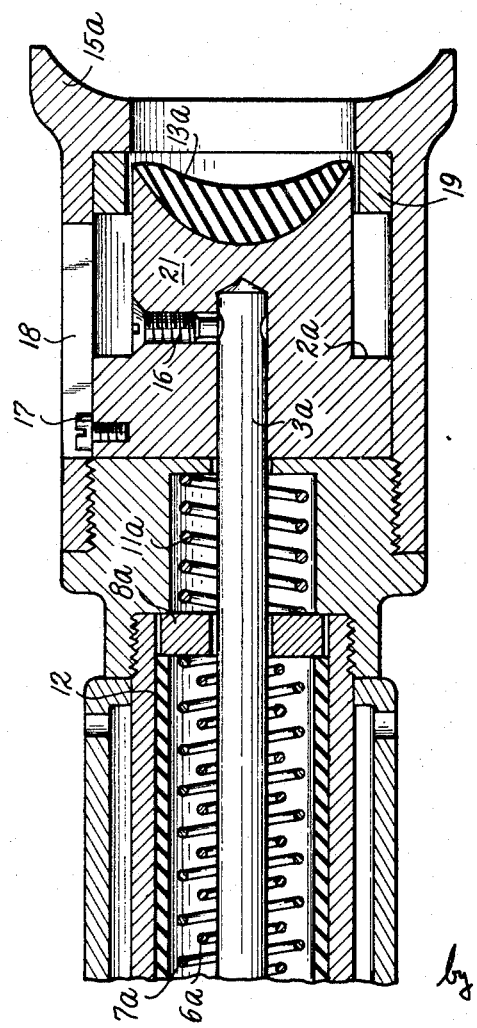
INVENTOR.
PIERRE MICHEL TERMET
by J. Harold Byers June 25, 1968 P. M. TERMET 3,389,425
DEVICE FOR SLAUGHTERING SMALL ANIMALS FOR FOOD
Filed Aug. 19, 1966 3 Sheets-Sheet 3

INVENTOR.
PIERRE MICHEL TERMET
BY J. Harold Byers

United States Patent Office 3,389,425
Patented June 25, 1968

3,389,425
DEVICE FOR SLAUGHTERING SMALL
ANIMALS FOR FOOD
Pierre Michel Termet, Impasse Belloeuf,
Lyon, Rhone, France
Continuation-in-part of application Ser. No. 388,528,
Aug. 10, 1964. This application Aug. 19, 1966, Ser.
No. 573,616
Claims priority, application France, Aug. 14, 1963,
944,795
6 Claims. (Cl. 17—1)

This application is a continuation-in-part of applicant's copending application, Ser. No. 388,528, filed Aug. 10, 1964, now Patent No. 3,284,845, issued Nov. 16, 1966.

It is known that in the slaughtering of animals for food, devices are used which operate on the principle of effecting a stunning blow with the purpose of rendering the animal insensible. In handling large animals such as cattle one method involves the use of a slaughtering pistol having a piston with a slaughtering head of appreciable mass, the piston being actuated by the propulsive force of a cartridge. In the case of large animals the force so generated is usually sufficient to perforate the skull of the animal. In the slaughtering of small animals such for example as sheep, perforation of the skull carries with it vertain objectionable features which have been outlined in considerable detail in applicant's copending application, Ser. No. 388,528 filed Aug. 10, 1964, of which this application is in part a division and in part a continuation.

For reasons that have been outlined in aforesaid application, the penetration of the skull of the animal is in many instances objectionable from a humane point of view and additionally the damage to the brain often renders same substantially valueless with respect to its market possibilities.

In view of these and other disadvantages specialists have recommended that the animals should be slaughtered not by perforation of the skull but by stunning. In this consideration the blow which the animal receives should on one hand be sufficient to render it completely unconscious and on the other should be not sufficiently violent to cause the instant death of the animal, in view especially of the practice of bleeding the animal after reducing it to a state of unconsciousness.

According to the present invention the device proposed and set forth in the following claims pertains to a strongly actuated plunger means driven by a spring and/or cartridge. In this device there is provided at the terminal end of the rod or piston a slaughter-head which traverses a certain distance of displacement inside the pistol between the time of initial impulse and the moment when the slaughter-head strikes the skull of the animal. In the device described in aforesaid copending application No. 388,528 means are provided whereby the slaughter-head is restored to its starting position after firing of a cartridge.

The present device is particularly adapted to the stunning of small food animals such as calves or sheep. It is an object of the present invention to provide a device which will not penetrate or fracture the skull upon delivery of impact.

An additional object contemplates the facilitation of bleeding of the animal after it has been rendered unconscious.

It has been found in accordance with the present invention that if the pistol device is provided with a slaughter-head having a shape and size so as to convey by inertia a given force against the skull of animal, and further if the slaughter-head is provided with a sizable layer or cushion of elastomeric material such as rubber, an effect is produced without penetration of breaking of the skull, which stuns the animal and renders it unconscious.

Inasmuch as small food animals vary in size and in particular in regard to the thickness of the skull, an impulse of given force does not in the case of prior devices result in identical effect at the point of impact. In small animals an insufficient stunning results, whereas for others, given the same impetus, breakage of the skull bone damages the brain and has other undesirable effects.

As a result of long experience and investigation by applicant it has been determined that the provision of an effective body of elastomeric material which may vary to some extent in shape, dimensions and elastomeric properties may be successfully used. It appears that not only is fracture or breakage of the skull avoided, but a shock wave is produced which is distributed throughout the brain. However, whatever the technical explanation may be it is found that the arrangement herein described and claimed is extraordinarily effective, permits the use of a unit force, and brings about the rendering unconscious of the animal to be slaughtered in a dependable and consistent manner. Without any limitation in regard to the manner of operation, it is reasonable to suppose that stunning occurs according to the phenomenon known as K.O. (knock-out) that occurs in certain boxing matches.

In the case of calves, the shock impulse is applied on the front part of the skull a little above the line of the eyes. In the case of sheep, by reason of the anatomy of these animals, it is not possible to stun them by striking them at this spot. This consideration has led applicant to further conceive of the stunning of sheep by striking them on the nape of the neck, that is on the back part of the skull. The embodiment hereinafter described which corresponds to this concept involves the use of a slaughter-head and surrounding chamber of concave shape corresponding to that of the back of the skull of the sheep.

In furtherance of the disclosure of the present invention reference now is made to the herewith submitted drawings.

FIG. 3 is a view in axial section of the forward end of a slaughtering pistol in another embodiment of the invention.

FIG. 4 is in end view corresponding to FIG. 3, observed in a direction from the right of FIG. 3.

Figure 1:
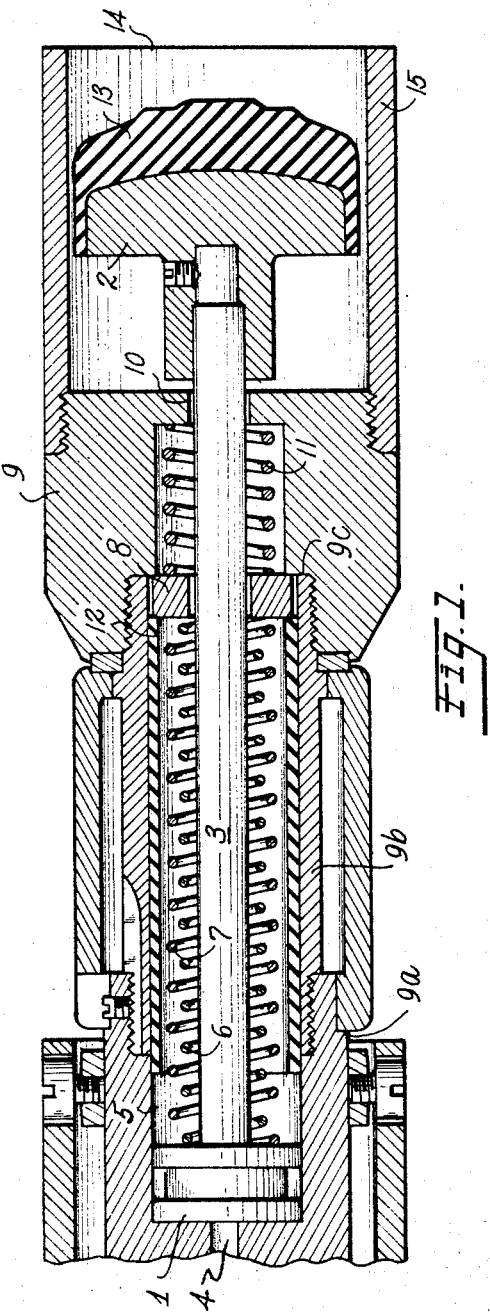
FIG. 1 is a longitudinal section through the forward end of a slaughtering pistol according to the present invention.

In the ensuing description the device corresponds to that of a cartridge operated pistol of the type set forth in applicant's copending application, Ser. No. 388,528. However, it will be understood that the use of an elastomeric cushion according to the present invention is not confined to employment with a cartridge fired pistol.

The drawing shows a piston 1 which is connected to a slaughter-head 2 through a rod 3 and which is propelled by the gases originating from the explosion of the cartridge situated in the chamber 4. The piston 1 is displaced inside the chamber 5 on the body formed by the members 9, 9a and 9b. The piston is restored towards the left by the two return springs 6 and 7 which bear, on the one hand against the piston 1 itself and on the other hand against the movable stop 8 surrounding the rod 3 and in the normal state resting against the member 9 in which a bore 10 serves as a guide for the rod 3. A compensating return spring 11 fitted in a seating formed in the member 9 likewise bears against the movable stop 8. The relative forces of the return springs 6 and 7 on the one hand and 11 on the other hand are such that in the position of rest and without any wear of the return springs 6 and 7, the movable stop 8 bears against the abutment 9c formed in the member 9.

The drawing likewise shows a shock-absorber 12 consisting of a hollow cylinder of rubber or similar material which is placed inside the chamber 5 and against which the piston 1 bears when it is propelled towards the right under the action of the gases originating from the explosion of the cartridge.

FIG. 1, which represents the position of the rest of the device, likewise shows that the slaughter-head is withdrawn in relation to the end 14 of the cylindrical sleeve 15 situated at the end of the pistol in such a manner that the slaughter-head 2 has to cover a predetermined distance between the moment when the cartridge is fired and the moment when the head strikes the animal's skull.

Figure 2:
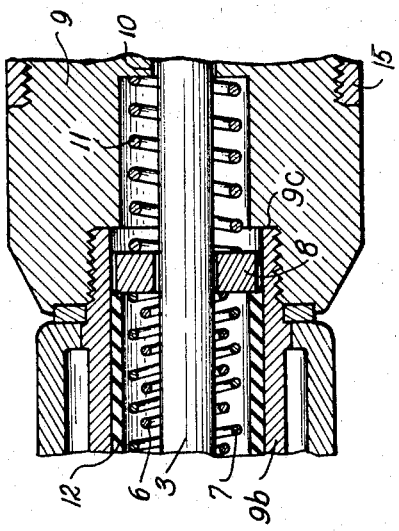
FIG. 2 is a partial view also in section, corresponding to FIG. 1 after a certain degree of wear of the return springs of the slaughter-head.

FIG. 2 shows how the compensating spring 11 works which, as previously explained, bears against the movable stop 8 in apposition to the return springs 6 and 7.

FIG. 2 illustrates the position which the movable stop 8 occupies after relatively long use of the device and at a moment when the return springs 6 and 7 have already suffered a certain amount of wear and could not restore the piston 1 to the position which it occupies in FIG. 1 if the stop 8 were fixed.

Assuming that the return springs 6 and 7 have suffered a certain amount of wear, they no longer have sufficient strength to push the movable stop 8 back sufficiently towards the right so that the compensating spring 11 displaces said movable stop 8 towards the left and thus enables the assembly comprising the piston 1, the slaughter-head 2 and the rod 3 which unites them, to be restored to the correct position at the moment when the cartridge is fired.

It will be seen that in these circumstances, even after the device has been in service for a very long time, that is to stay after a certain amount of wear on the return springs 6 and 7, the correct positioning of the slaughter-head at the moment of firing is nevertheless obtained as a result of the compensating spring 11 which, as will easily be understood, is not subjected to any stress and consequently does not suffer any wear so long as the return springs 6 and 7 are themselves capable of restoring the piston 1 to the position illustrated in FIG. 1.

FIGS. 3 and 4 illustrate in axial section and end view respectively of another embodiment of the slaughtering pistol according to the invention. In this embodiment, the return springs 6a and 7a, the movable ring 8a and the compensating spring 11a are again found. It will likewise be seen how the slaughter-head 2a is fixed to the rod 3a by means of a screw 16.

In this embodiment of the invention, the front end of the sleeve 15a, inside which the slaughter-head is displaced, as well as the front portion of the slaughter-head 21, are cut away to a concave cylindrical contour, the axis of said cylinder being perpendicular to the axis of the pistol and likewise perpendicular to the plane of FIG. 3, in such a manner that the end of the pistol on the one hand and the end of the slaughter-head 21 have a corresponding shape which conforms substantially to the shape of the nape of the neck of the animal to be slaughtered.

As FIG. 3 shows, a screw 17 fixed in the slaughter-head 21 is displaced in a longitudinal aperture 18 formed in the end of the pistol in such a manner that the slaughter-head 21 cannot execute any movement of rotation about the rod 3a.

As FIG. 3 likewise shows, a shoulder 2a situated at the periphery of the slaughter-head 21 bears, at the end of the stroke of the head, against a second shock-absorber 19 formed by a rubber ring for example.

Figure 5:
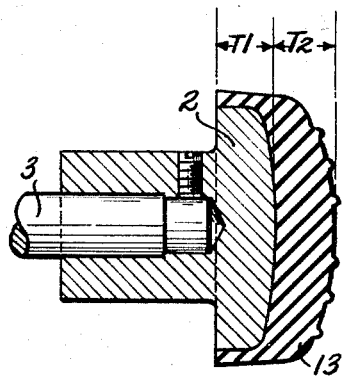
FIG. 5 is a view partly in section showing a slaughter-head according to the embodiment of FIG. 1.
Figure 8:
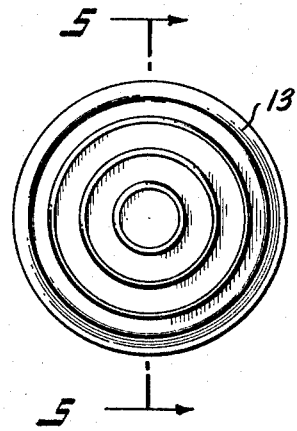
FIG. 8 is an end view corresponding to FIG. 5, observed from right.
Figure 6:
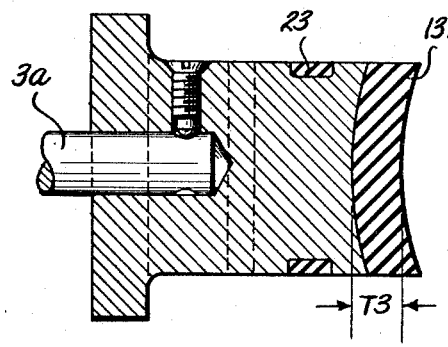
FIG. 6 is a sectional view of a modified form of slaughter-head corresponding in general to the embodiment of FIGS. 3 and 4.
Figure 7:
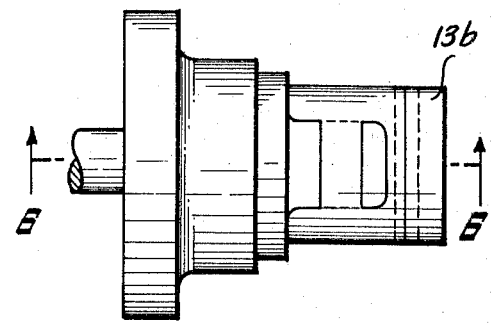
FIG. 7 is a plan view of the slaughter-head illustrated in FIG. 6.

Referring specifically to FIGS. 5 to 7, these illustrate forms of elastic cushions suitable in the practice of the invention. For purposes of illustration it may be assumed that the elastomeric material is rubber, either natural or synthetic rubber.

The shape and the size of the elastic cushion may vary quite considerably, but should accord to the purposes and functions set forth in the specification. The examples illustrate the use of elastic cushion elements 13 and 13b having a thickness as measured between two lines drawn perpendicular to the lens axis through the points where the axis intersects the outer and inner surfaces of the lens-shaped cushion. These lines as illustrated define an approximate thickness of 8 mm. As may be seen by reference to the drawings the lens-shaped rubber cushion element need not be of a uniform thickness throughout. The lens-shaped rubber cushion member of FIG. 5 thins toward the edges, and the cylindrical concavo-convex lens shape of FIGS. 6 and 7 may be of uniform thickness but as illustrated varies slightly from center to the edges. Further, the surface and thickness of the cushion body need not vary uniformly as may be seen in FIGS. 7 and 5. The illustrated conformations, as will be understood, do not constitute limits on the possibilities of variation.

In general, it is necessary that the cushion of elastomeric material be of sufficient thickness to transmit a merely stunning blow or concussion as contrasted with puncture or fracture of the skull of the animal. In this, the shock is distributed in a heterogeneous manner throughout the cranium rather than being localized at a given point. Moreover, in the practice of the invention, it is necessary to employ as the elastomeric material, a substance of suitable elasticity or hardness. And while variation in this factor is manifestly permissible it is found that a value of 70 points Shore hardness is satisfactory.

In the illustration according to FIG. 5 the external substantially spherical surface of the lens-shaped cushion is taken on a radius of 40 mm., and the inner surface on a radius of 80 mm. The diametric measurement is taken as 38 mm. Whereas these dimensions have proved effective, it is clear that they are not limiting as regarding the scope of the invention. In FIG. 6 the inner cylindrical surface 30 is taken on a radius of 45 mm. and the outer concave cylindrical surface 31 is also taken on a radius of 45 mm. The measurement from edge to edge of the section of cylinder represented is 30 mm. These dimensions also have been found practical but also are not to be construed as limitations of the scope of the invention.

It will be readily understood by those skilled in the art that the aforesaid examples can be varied and that the scope of the invention accords to the subject matter of the subjoined claims.

What is claimed is:

1. In a slaughtering pistol for small food animals, having a longitudinally displaceable stunning head, said pistol comprising a rod on which said stunning head is carried, a chamber in which said rod and said stunning head are slidably mounted, and means for forceably driving said rod and rod slaughter-head forwardly into impact with the skull of the animal, said stunning head being covered by a cushion of elastomeric material of sufficient thickness to produce on impact of stunning magnitude, a concussion devoid of structural damage to the skull of said animal.

2. A slaughtering pistol according to claim 1 wherein said cushion of elastomeric material has an overall thickness of approximately 8 mm.

3. A slaughtering pistol according to claim 1 wherein said cushion is formed of rubber.

4. A slaughtering pistol according to claim 1 wherein said cushion has a convex forward surface.

5. A slaughtering pistol according to claim 1 wherein said cushion has a forward surface of concave cylindrical form.

6. A slaughtering pistol according to claim 1 wherein said cushion is formed of an elastomeric material having a Shore hardness of approximately 70 points.

References Cited

UNITED STATES PATENTS

| | | | |
|---|---|---|---|
| 1,472,309 | 10/1923 | Prisk | 17—1 |
| 2,922,185 | 1/1960 | Aitken et al. | 17—1 |
| 3,067,454 | 12/1962 | Catlin et al. | 17—1 |

LUCIE H. LAUDENSLAGER, *Primary Examiner.*